UNITED STATES PATENT OFFICE

PAUL SCHUFTAN, OF HÖLLRIEGELSKREUTH, NEAR MUNICH, GERMANY, ASSIGNOR TO GESELLSCHAFT FÜR LINDE'S EISMASCHINEN A. G., OF MUNICH, GERMANY, A CORPORATION OF GERMANY

PROCESS FOR THE PREPARATION OF HYDROGEN FROM GAS MIXTURES CONTAINING HYDROCARBONS

No Drawing. Application filed August 21, 1929, Serial No. 387,562, and in Germany August 20, 1928.

This invention relates to the preparation of hydrogen from gas mixtures containing hydrocarbons.

Hydrocarbons can be decomposed with steam into hydrogen in accordance with the following two equations:

$$\text{I.}-CH_4+H_2O=3H_2+CO$$
$$\text{II.}-CH_4+2H_2O=4H_2+CO_2$$

Heretofore only the reaction represented by the first equation has been utilized in the commercial preparation of hydrogen. This reaction requires high temperatures. The second reaction, on account of the low temperature at which it takes place, requires especially active catalysts which are very sensitive to the catalyst poisons, which are always present in commercial gases. In both cases it is practically impossible to obtain directly pure gases such as are necessary in ammonia synthesis for example, but it is necessary to resort to roundabout and expensive procedures such as subjecting the decomposition products to further treatments or carrying out the decomposition in several stages with intermediate absorption.

The process of the present invention comprises an especially advantageous combination of hydrocarbon-decomposition with a process of resolving the gaseous mixture into its constituents by cooling under pressure. This process makes it possible to decompose the hydrocarbons to hydrogen in a single reaction step with an almost 100% yield and to obtain at the same time products of highest commercial purity in an economical manner.

The gas mixtures to be decomposed over the catalyst must contain at least 60% of hydrocarbons; they must be free from catalyst poisons and must have a very low hydrogen content since hydrogen greatly diminshes the yield of decomposition products. However the gas mixture may contain unsaturated hydrocarbons and oxygen. If a gas mixture of this kind, for example natural gas, which may be passed through the catalyst tube without pretreatment, is not available, the removal of catalyst poisons and hydrogen from the gas mixture is effected by a compression and cooling process. In this process two liquid fractions are formed by fractional condensation, the first being a small fraction containing all the catalyst poisons, chiefly the organic sulphur compounds, together with heavy hydrocarbons, while the second fraction includes practically all of the hydrocarbons of the initial gas mixture. A gas rich in hydrogen remains after the condensation of the second fraction; it can be washed with liquid nitrogen in a washing column to produce hydrogen which is free from carbon monoxide and free from hydrocarbons, and which is adapted for synthesis purposes.

The (second) hydrocarbon fraction contains practically all the hydrocarbons of the initial gas but in a concentrated and enriched form; it is free from catalyst poisons and has a very low hydrogen content accordingly corresponding to the conditions mentioned above. This fraction is expanded, revaporized and rewarmed, and is then mixed with an excess of steam. The resulting gas mixture is preheated and then decomposed in the catalyst tube. It is not necessary to strive for a quantitative decomposition of the hydrocarbons (methane) according to reaction II; the undecomposed hydrocarbons are separated from the carbon dioxide and the hydrogen produced along with the hydrocarbons of the gaseous starting material on being passed through the cooling apparatus and are again passed over the catalyst whereby only a small additional expenditure of compression and refrigeration energy is necessary. This additional energy is more than compensated for since the process is operated at low temperatures and with only a small excess of steam.

By way of example the operation of the process will be described in connection with the decomposition of coke oven gas.

Coke oven gas from which tar and the inorganic sulfur compounds have been separated in the usual manner is mixed with the gas obtained by the catalytic process as described below. The mixture is compressed to a pressure of, say, 10 atmospheres, is then freed from ammonia and carbon dioxide by washing with water and is then cooled in several stages to a low temperature with the aid of a refrigerant such as liquid nitrogen. In the first cooling stage all the impurities which may act as catalyst poisons are condensed at about −125° C. together with heavy hydrocarbons. This liquid fraction is collected separately. In the second cooling stage practically all of the hydrocarbons present in the initial gas are condensed at about −180° C. and are also collected separately. This fraction contains about 70 to 90% of hydrocarbons consisting principally of methane. The residual gas very rich in hydrogen is washed with liquid nitrogen in a washing column whereby the hydrogen is completely freed from hydrocarbons and carbon monoxide. After washing, the liquid nitrogen which contains the carbon monoxide and the other impurities of the hydrogen is separated out as a special fraction.

The (second) hydrocarbon fraction is expanded, revaporized and rewarmed. During the rewarming the cold given up is transferred in counter-current exchangers to fresh incoming gas. Then steam in excess is admixed and after preheating to about 500° C. the gas mixture is decomposed in the catalyst tube. The catalyst may consist of any of the well known hydrogenation catalysts. A catalyst prepared by impregnating pieces of clay with a mixture of nickel and aluminum oxide and reducing the mass in a current of pure hydrogen at a temperature between 300 and 400° C. is preferred. Instead of aluminium oxide, thorium or cerium oxide or other oxides of the rare earth metals for example, may be used. Instead of nickel, other metals of group eight of the periodic table may be used. Over this catalyst about 75% of the hydrocarbons are decomposed according to reaction II into hydrogen and carbon dioxide. The hot decomposition products are utilized to preheat fresh gas—steam mixture before the latter is passed through the catalyst tube. After cooling to room temperature whereby the excess of the water vapor is condensed, the decomposition products, which consist of 18% $CO_2$, 2% CO, 61% hydrogen, 13% methane and 6% nitrogen, are mixed with fresh coke oven gas and the cycle is repeated. In the compression and cooling stages of the process the hydrocarbons and the hydrogen of the coke oven gas and of the decomposition products are separated and collected together as a pure and enriched hydrocarbon fraction adapted for catalytic decomposition and as a pure hydrogen fraction adapted for synthesis purposes.

In this manner the methane content of the coke oven gas is practically completely converted by the process described into hydrogen and carbon dioxide without the production of noteworthy quantities of CO. This is a great advantage, since not only is it much easier to separate the $CO_2$, but also one molecule more of hydrogen results from every molecule of methane, than in the conversion to CO according to reaction I. The fact that the hydrocarbons to be catalytically decomposed are present in high concentration in the gas mixture and the fact that it is not necessary to strive in the first instance for complete decomposition make it possible to pass the gas mixture through the decomposition apparatus at relatively high velocity and to use very small amounts of the catalyst. In view of the possibility of carrying out the process in small decomposition chambers heat losses may be greatly diminished. The advantage of operation at low reaction temperatures is obvious.

Under certain conditions it is advantageous to burn certain of the fractions obtained in the compression and cooling stages of the process such as the nitrogen-carbon monoxide fraction mentioned above in order to provide the heat for the decomposition reaction. The waste gas which results from the expansion of the water utilized for washing the carbon dioxide may be advantageously used for the same purpose.

The heat required in the decomposition reaction may also be supplied by mixing oxygen with the gas which is to be decomposed whereby some of the hydrogen formed therefrom is burned and the heating thus takes place in the gas itself. This method of operation is not expensive because the necessary oxygen is obtained as a by-product in the preparation of the nitrogen required in the condensation steps of the process.

Other gases may be decomposed by the method described in the foregoing example. Besides methane, other hydrocarbons may be converted whose hydrogen yield rises with the number of carbon atoms while the heat requirement falls.

Gaseous starting materials having a high hydrocarbon content and containing neither contact poisons nor hydrogen, such as natural gas, for example, can be decomposed over the catalyst without pretreatment. In this case also the decomposition is incompletely performed, say only 70% of the hydrocarbons being decomposed. As described in the foregoing example for the treatment of coke oven gas, the hydrocarbons not decomposed over the catalyst are separated in the compression and cooling stages of the process and are returned to the contact tube as a fraction free from hydrogen and of high hydrocarbon content. The new process has also in the case of the treatment of natural gases and so on as a raw material the great advantage that a greater total yield and a higher purity of hydrogen are obtained than in the case of known catalytic decomposition processes not involving the herein-described cooling cycle.

Steam is preferably used as the oxidizing agent in the present process but it is also possible to replace the steam partly or entirely by other oxygen compounds, for example, carbon dioxide, or by free oxygen.

It is to be understood that this invention is not limited to the particular materials or operating conditions given by way of example.

I claim:

1. In a process of catalytically decomposing a hydrocarbon-containing gas mixture into hydrogen and carbon dioxide in the presence of an excess of steam at about 500° C., the step which comprises separating hydrogen and catalyst poisons from the gas mixture and concentrating the hydrocarbons in the gas mixture from which hydrogen and catalyst poisons have been separated to at least 60% before subjecting the same to decomposition.

2. In a process of catalytically decomposing into hydrogen and carbon dioxide a gas mixture comprising hydrogen, carbon dioxide and hydrocarbons, the steps which comprise separating the carbon dioxide from the mixture, compressing and cooling the gas mixture, separating therefrom a condensate containing heavy hydrocarbons and all of the catalyst poisons, further cooling the gas mixture and separating therefrom a liquid fraction containing practically all of the hydrocarbons in concentrated form, revaporizing and rewarming the said fraction, adding steam thereto in excess, preheating the resulting mixture and passing it over a highly sensitive hydrogenation catalyst at about 500° C.

3. In a process of catalytically decomposing into hydrogen and carbon dioxide a gas mixture comprising hydrogen and a relatively small amount of hydrocarbons, the steps which comprise compressing and cooling the gas mixture, separating therefrom a condensate containing all the catalyst poisons together with heavy hydrocarbons, further cooling the gas and collecting a liquid fraction containing practically all of the hydrocarbons of the initial gas in concentrated form, revaporizing and rewarming the said fraction, adding steam thereto in excess, preheating the resulting mixture and passing it over a highly sensitive hydrogenation catalyst heated at about 500° C.

4. A process as claimed in claim 3 wherein the gas remaining after the separation of the hydrocarbon fraction is washed with liquid nitrogen to produce pure hydrogen.

5. In a process of decomposing hydrocarbon gas mixtures catalytically into hydrogen and carbon dioxide with steam, the steps which comprise compressing the gas mixture leaving the contact apparatus, separating the carbon dioxide therefrom by washing with water, cooling the gas and collecting the liquid fraction containing practically all of the hydrocarbons in a concentrated form which have escaped the catalytic decomposition, revaporizing and rewarming the said fraction, adding steam thereto in excess, preheating the mixture and passing it over a highly sensitive hydrogenation catalyst heated at about 500° C.

6. A process as claimed in claim 5 wherein the gas remaining after separation of the hydrocarbon fraction is washed with liquid nitrogen to produce pure hydrogen.

7. A process as claimed in claim 3 wherein the gas leaving the contact apparatus is added to the initial gas mixture and the resulting mixture is subjected to the compression and cooling steps.

8. A process as claimed in claim 3 wherein the gas leaving the contact apparatus is added to the initial gas mixture and the resulting mixture is subjected to the compression and cooling steps and wherein the gas remaining after the separation of the hydrocarbon fraction is washed with liquid nitrogen to produce pure hydrogen.

9. A process as claimed in claim 3 wherein the operations of cooling the gas mixture are carried out with liquid nitrogen and oxygen is added to the mixture of hydrocarbons and steam before it is passed over the catalyst and supplying in this manner a part or all of the heat required in the catalytic decomposition reaction.

10. A process as claimed in claim 5 wherein the operations of cooling the gas mixture are carried out with liquid nitrogen and oxygen is added to the mixture of hydrocarbons and steam before it is passed over the catalyst and supplying in this manner a part or all of the heat required in the catalytic decomposition reaction.

11. A process as claimed in claim 3 wherein the gas remaining after separation of the hydrocarbon fraction is washed with liquid nitrogen and the resulting carbon monoxide-nitrogen fraction is burned to provide heat for the catalytic decomposition reaction.

12. A process as claimed in claim 2 wherein the initial gas mixture is first compressed, washed with water to remove carbon dioxide before cooling and the wash water is expanded, wherein the gas remaining after separation of the hydrocarbon fraction is washed with liquid nitrogen and wherein the resulting carbon monoxide-nitrogen fraction and the waste gases resulting from the expansion of the wash water are burned to provide the heat for the catalytic decomposition reaction.

In testimony whereof, I affix my signature.

PAUL SCHUFTAN.